(No Model.)
2 Sheets—Sheet 1.
C. A. EISENHART.
DENTAL ELECTRIC APPARATUS.
No. 388,482. Patented Aug. 28, 1888.
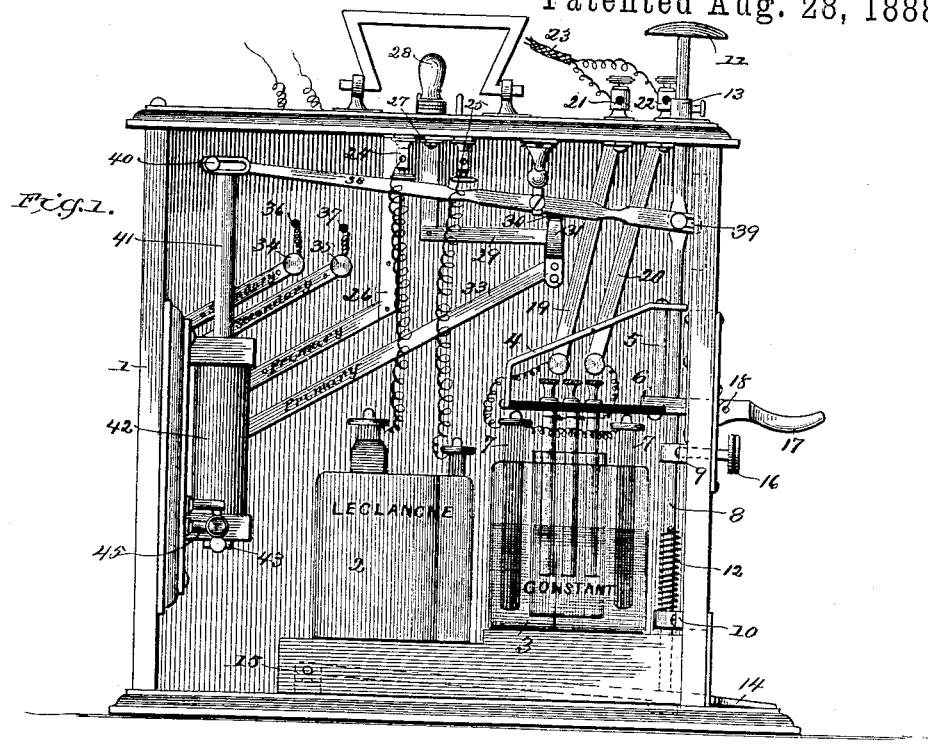
WITNESSES,
Edwin L. Yewell.
Jos. A. Ryan
INVENTOR,
Chas. A. Eisenhart,
by Robt. H. Read.
his Attorney.

(No Model.) 2 Sheets—Sheet 2.
C. A. EISENHART.
DENTAL ELECTRIC APPARATUS.
No. 388,482. Patented Aug. 28, 1888.
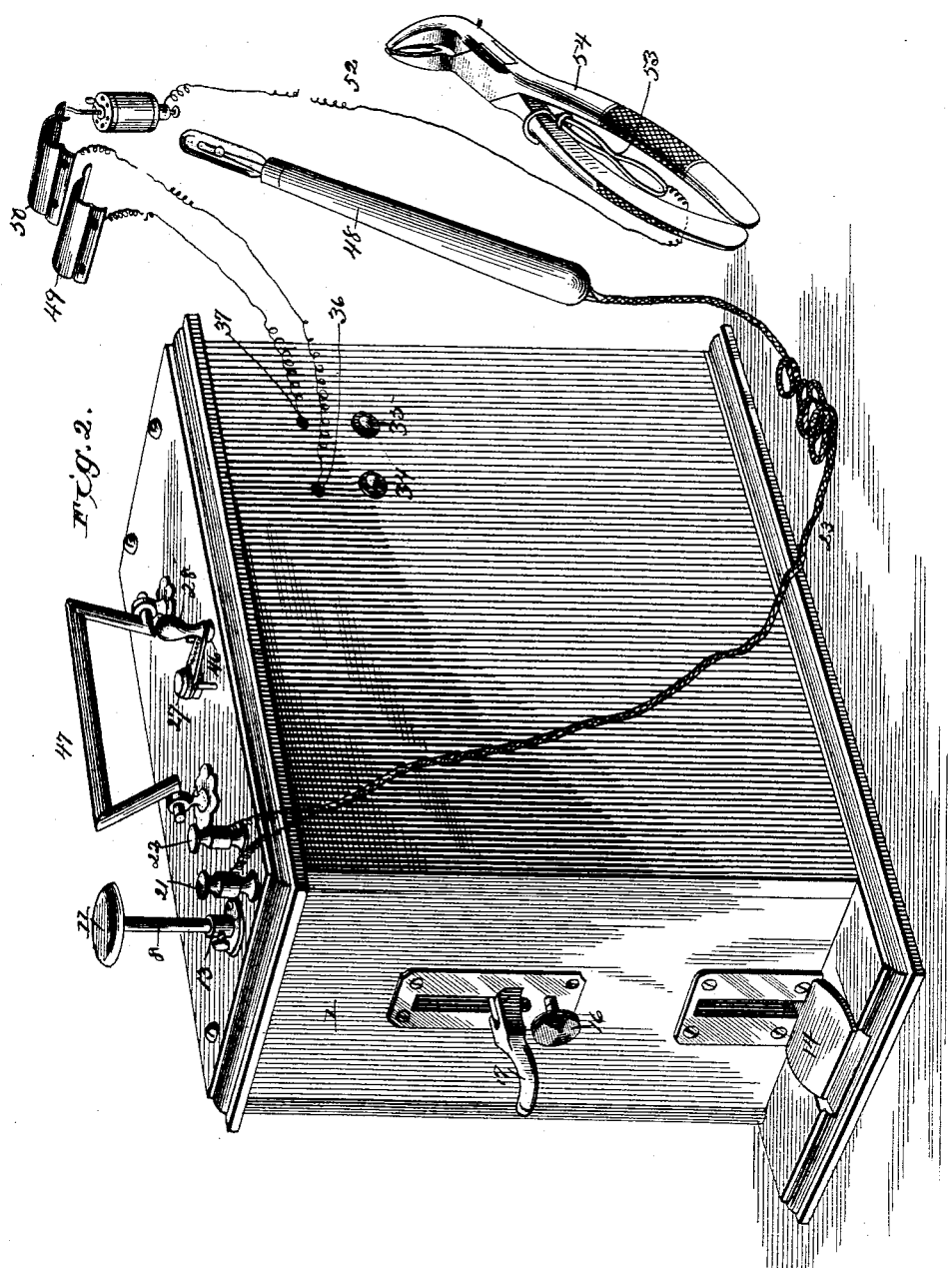
WITNESSES.
Edwin L. Yewell.
Jos. A. Ryan.
INVENTOR,
Chas. A. Eisenhart.
by Ross & Read,
his Attorney.

UNITED STATES PATENT OFFICE.

CHARLES AUGUSTUS EISENHART, OF YORK, PENNSYLVANIA.

DENTAL ELECTRIC APPARATUS.

SPECIFICATION forming part of Letters Patent No. 388,482, dated August 28, 1888.

Application filed January 3, 1888. Serial No. 259,630. (No model.)

*To all whom it may concern:*

Be it known that I, CHARLES AUGUSTUS EISENHART, a citizen of the United States, residing at York, in the county of York and State of Pennsylvania, have invented certain new and useful Improvements in Dental Electric Apparatus; and I do hereby declare the following to be a full, clear, and exact description of the invention, such as will enable others skilled in the art to which it appertains to make and use the same.

This invention relates to dental electric apparatus for relieving the suffering occasioned by the extraction of teeth and for facilitating an examination of the mouth, and is an improvement on the apparatus described in a patent issued to me on November 24, 1885, numbered 331,121.

The object of the invention is to render the apparatus easier to control and give it a wider range of use.

To these ends my invention consists in certain features of construction, which will be hereinafter fully set forth in the specification, and then definitely indicated in the appended claims.

In the accompanying drawings, Figure 1 is an elevation of my apparatus, the front of the casing being removed. Fig. 2 is a view in perspective, looking from the rear of the apparatus, showing the mouth-lamp, the hand-electrodes, the forceps, and their circuit-connections. Fig. 3 is a detached view of the automatic vibrator or rheotome. Fig. 4 is a detail view of a circuit-closer used in the primary circuit. Figs. 5 and 6 are detail views of the devices for connecting the forceps in the secondary circuit and a rheostat for varying the induced current.

In a suitable casing, 1, are placed two or more cells of battery, 2 3. I prefer for this purpose one of the cells to be adapted for open-circuit work and the other to maintain the current at a sufficient degree of constancy for maintaining at incandescence for short periods a small mouth-lamp. The Leclanché and bichromate batteries would answer well for these respective requirements. The poles of battery 2 are connected with binding-posts 24 25, secured to the under side of the top 25, being in metallic connection with the pivotal bearing 27 of a switch, 28. The switch 28 has sufficient play between two stop-pins to enable it to be thrown on or off the contact 46, Fig. 2. Post 24 is in circuit through conductor 26 with one terminal of the primary of an induction-coil, 42, and contact 46 is connected by a conductor with a spring, 30, secured to the casing. This spring has secured to its under side a piece of insulating material, 32, Fig. 4, and when in its normal position another contact-spring, 31, bears upon this insulating material. Spring 31 is in circuit with the other terminal of the primary of the induction-coil through conductor 33. A rocking-bar, 38, is hung from the casing in operative relation to the spring 30, and when the bar is depressed to the right of its pivot spring 30 is bent down, and, acting upon spring 31, forces its free end off the insulating spot and causes it to make a scraping contact with the end of spring 30. The secondary of the induction-coil is connected to binding-posts 34 35, whence proceed through holes 36 37 in the back of the casing conductors leading to dischargers or hand-electrodes 49 50. The latter in use are secured to the arms of a dental chair, as set forth in my patent above referred to.

One end of the lever 38 is slotted at 39, and a pin on a vertical rod, 8, projects through the slot. This rod is supported so as to slide up and down in bearings 9 and 10 and one in the top of the casing. The rod is pivotally secured at its lower end to a foot-lever, 14, the latter being pivoted at a point, 15, within the casing and having a projecting treadle on which the foot may bear to depress rod 8. A spring, 12, co-operates with the rod, so as to hold it in vertical position when it is free to respond to the resilience of the spring. A thumb-screw, 16, projects through the casing and can be adjusted in the support 9, so as to hold the rod at any point of depression. Above the top of the casing the rod is provided with an adjustable collar, 13, which regulates the degree of depression of the rod. Lever 38 carries a pin, 40, on its other arm, which pin co-operates with a slot in an extension-piece on a metallic tube, 41, arranged to slide freely over the core of the induction-coil. The function of the slots in lever 38 and the magnetic shield is to compensate for the movement of the ends over an arc of a circle.

Frictionally secured to rod 8 is a frame, 4

5 6, carrying a rigid strip of insulating material, on which the zincs for the constant-current battery-cell are supported. The portion 6 of this frame projects through a slot in the side of the casing, (shown in Fig. 2,) and has pivoted to its outer extremity at 18 a clamping-lever, 17. By turning this clamping-lever to the position shown in Fig. 1 the frame will be locked to the side of the casing, and will remain stationary, irrespective of the movements of the rod 8. Suitable binding-posts connected, respectively, with the positive and negative elements of battery 3 are secured to the casing, whence connection is made by conductors 19 20 with binding-posts 21 22 on the outside of the case. The mouth-lamp 48 is placed in circuit with these binding-posts through multiple conductor 23.

In order to render the rheotome of the induction-coil readily accessible for adjustment, I provide the core of the coil with a polar extension, 43, extending toward the front of the apparatus, and the vibrator and back stop 44 and 45, faced with platinum at the striking-points, as usual, are suitably mounted in front of said extension. An additional advantage resulting from this arrangement is that the increase of the mass of iron at the pole renders the instrument operative with weaker currents, so that a single cell of battery can be relied upon to operate the rheotome, even when the battery is partially polarized.

In some cases it may be desired to introduce the high-tension current furnished by the induction-coil or the battery-current itself into the muscles around the tooth during the extraction of the latter. For this purpose I use the attachment shown in Figs. 2, 5, and 6, in which 51 is a removable adjustable rheostat provided with a hook, 59, for hanging it to the hand-electrode 50. Surrounding the hook, and in electric connection therewith, is a switch, 60, adapted to be moved over a set of contacts, 61 62 63 64, &c., to vary the number of coils in circuit, and consequently the resistance of said circuit, in a manner that will be evident to those familiar with the art. The device shown in Fig. 6 is adapted to clamp a handle of the dental forceps 54 when the clip is attached, and ring 58 is forced into the position shown in Fig. 2, and the forceps may be removed by slipping the ring back into the position shown in Fig. 6.

The operation of the apparatus will now be understood. In case a cavity of a tooth or any part of the mouth is to be examined, the lamp-current is thrown on by pressing the button 11 on rod 8 with the hand or foot or by treading on the foot-lever. This carries the frame 4 5 6 bearing the zincs down into the exciting-fluid, where it may be locked during the examination by the set-screw 16 acting on the rod or by the clamp 17. When the examination is concluded, the rod is released and the zincs raised out of the excitant by spring 12, and then may be locked in an elevated position by the clamp 17, which leaves the apparatus free for use during the extracting operation, during which the zincs will be held up irrespective of any shifting of rod 8. The depression of rod 8 closes the circuit at springs 30 31; but as it is open at the switch 28 the primary circuit through the induction-coil will not be closed until this switch is thrown into engagement with contact 46—in other words, the primary circuit is open normally at two points, contact at one point being controlled by the rod 8 and at the other by switch 28. The hand-switch may be used when the rod is depressed to its full limit and the shield over the core is raised to its highest point. The shield is then in position to permit the greatest strength of induced current to be developed in the secondary circuit, and by shifting the switch this current may be developed or stopped at will. It will thus be seen that currents of different tensions may be induced in the secondary circuit by depressing the rod to different degrees, the shield 41 being raised from the core a distance proportional to the amount of said depression.

By shifting the switch-arm of the rheostat to different contacts the induced current may be varied in intensity within wide limits, as a different resistance is thrown into the induced circuit for every successive contact to which the switch may be turned. It will be observed that the rheostat is located in the forceps branch of the therapeutic circuit, and it should be so placed whether the primary or the induced current is administered, as when located at this portion of the circuit it attemperates the effect on the muscles in electric connection with that branch to a greater degree than if placed in a part of the circuit remote from said muscles. If, for example, this coil were hung on distributing-electrode 49, the shock would be ameliorated for the muscles of the hand in contact with said electrode, while the muscles of the mouth would receive relatively a much more severe contraction.

By "distributing-electrodes" in this case I mean the conductors which introduce the current into the body of the patient, and so call them to avoid confusion with the term "electrode" as a definitive of the element of a battery.

Having thus described my invention, what I claim as new, and desire to secure by Letters Patent, is—

1. The combination of a vertically-movable rod, a spring for normally holding said rod elevated, a lever acted upon by the rod, an induction-coil provided with a regulator controlled by the lever, a circuit-closer in the primary circuit in operative relation to the lever, and a lock for engaging the rod and holding it at any degree of depression.

2. The combination of a sliding rod, an adjustable collar for regulating the degree of thrust of said rod, an induction-coil, and regulating devices therefor controlled by said rod.

3. The combination of a sliding rod, battery-elements carried thereby and frictionally secured thereto, and a locking device for maintaining the elements in a fixed position, whereby the rod may be reciprocated independently of the elements.

4. The combination of a sliding rod, battery-elements carried by said rod, an electric lamp, circuit-connections between the elements and lamp, a second circuit, a circuit-closer therein actuated by a movement of the rod, an induction-coil in said second circuit, a regulator for the induced current controlled by the rod, and means for locking the rod when shifted.

5. In a dental apparatus, the combination of a battery induction-coil and rheotome, distributing-electrodes outside the instrument in the secondary circuit, a circuit-closer in the primary circuit, a lamp-circuit electric lamp connected therewith by flexible connections, and a circuit-closer for controlling the lamp-circuit.

6. The combination of metallic spring 30, provided with an insulated spot on one face thereof, metallic spring 31, co-operating with spring 30 and normally bearing on the insulated spot, and a push-piece for forcing the springs together, whereby a scraping contact may be made with the metal adjacent to the spot.

7. The combination of a source of electricity, a distributing-electrode in circuit with one pole thereof, a pair of dental forceps, and a clip in circuit with the other pole, said clip being provided with gripping-jaws to engage the handle of the forceps, and means for locking the jaws in engagement with the handle.

8. In a dental electric apparatus, the combination of an electric conductor provided at its terminals with distributing-electrodes adapted to convey the current to a patient to be operated upon, a resistance-coil in circuit with said conductor near one of the terminals to moderate the effect of the current on the part of the body to which the said terminal is applied, and a connector for connecting and disconnecting one of the electrodes to said conductor.

9. In a dental electric apparatus, the combination of a generator of electricity, an electric circuit, a distributing-electrode at one circuit-terminal, a pair of dental forceps at the other circuit-terminal, and an adjustable rheostat in the forceps branch, as and for the purpose set forth.

10. In a dental electric apparatus, the combination of a generator of electricity, an induction-coil, primary and secondary circuits, a distributing-electrode at one secondary terminal, a pair of dental forceps at the other secondary terminal, and an adjustable resistance-coil in the secondary circuit, as and for the purpose set forth.

11. In a dental electric apparatus, the combination of an electric circuit, a distributing-electrode in said circuit for conveying the current to the patient to be operated upon, and a resistance-coil in juxtaposition with said electrode to moderate the effect of the current on the portion of the patient's body to which said electrode is applied, for the purpose set forth.

In testimony whereof I affix my signature in presence of two witnesses.

CHARLES AUGUSTUS EISENHART.

Witnesses:
S. M. GABLE,
GEO. B. KRABER.